US 6,633,491 B2

(12) United States Patent
Malone et al.

(10) Patent No.: US 6,633,491 B2
(45) Date of Patent: Oct. 14, 2003

(54) SUPPORT FOR VARYING SIZES OF MEMORY CARDS FOR SHOCK AND VIBRATION

(75) Inventors: Christopher Gregory Malone, Folsom, CA (US); Stephan Karl Barsun, Auburn, CA (US); Thomas J. Augustin, El Dorado Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 18 days.

(21) Appl. No.: 09/932,372

(22) Filed: Aug. 17, 2001

(65) Prior Publication Data

US 2003/0035279 A1 Feb. 20, 2003

(51) Int. Cl.[7] .................. H02B 10/052; H05K 7/12
(52) U.S. Cl. .................. 361/825; 361/801; 361/804; 361/742; 361/758; 361/796; 211/41.17
(58) Field of Search ................. 361/730, 796, 361/797, 801, 804, 825, 759, 742

(56) References Cited

U.S. PATENT DOCUMENTS

| | | | |
|---|---|---|---|
| 3,863,113 A | | 1/1975 | Ward |
| 3,950,603 A | | 4/1976 | Brefka |
| 5,623,396 A | * | 4/1997 | Blackwell .................. 361/801 |
| 5,642,263 A | * | 6/1997 | Lauruhn .................... 361/801 |
| 5,822,193 A | * | 10/1998 | Summers et al. ........... 361/759 |
| 5,944,199 A | * | 8/1999 | Corisis et al. ........... 211/41.17 |
| 5,996,962 A | * | 12/1999 | Chang et al. ............... 248/694 |
| 6,022,234 A | * | 2/2000 | Shinoto et al. ............. 439/327 |
| 6,031,733 A | * | 2/2000 | Corisis et al. ............. 361/825 |
| 6,220,887 B1 | * | 4/2001 | Downs ....................... 439/377 |

FOREIGN PATENT DOCUMENTS

WO    WO 00/22624    4/2000

* cited by examiner

*Primary Examiner*—David Martin
*Assistant Examiner*—Dameon E. Levi

(57) ABSTRACT

A method and apparatus to support varying sizes of memory cards against shock and vibration. One embodiment of the invention involves a method to assemble a support clip to one or more cards attached on a substrate by a connector. A second embodiment of the invention involves a method to fabricate a support clip. A third embodiment of the invention involves an assembled substrate with a plurality of cards secured by one or more support clips to the substrate.

21 Claims, 8 Drawing Sheets

SUPPORT FOR VARYING SIZES OF MEMORY CARDS FOR SHOCK AND VIBRATION

BACKGROUND OF THE INVENTION

1. Field of the Invention

This invention relates generally to supporting cards against shock and vibration, and more particularly to supporting varying sizes of cards against shock and vibration while allowing most air-flow to reach the cards.

2. Description of the Prior Art

In many data processing systems (e.g., computer systems, programmable electronic systems, telecommunication switching systems, control systems, and so forth) one or more cards (e.g., memory cards populated with static or dynamic electronic memory components) are perpendicularly attached to substrates (e.g., motherboards or memory extenders) for data access for data processing. If multiple memory cards are used, the memory cards are typically identical in size, even though the memory capacity required in each memory card can vary significantly.

However, if memory cards of different sizes are incorporated into the data processing system, it can be very difficult to support them against shock and vibration. Conventional memory card support clips do not provide good shock and vibration protection to the memory cards perpendicular to the cards; and supports also frequently block the cooling air-flow needed to avoid excessive temperature buildup. A lack of adequate cooling air-flow will typically cause the temperature of one or more electronic components to quickly rise to a temperature that results in either temporary or permanent operational failure of the electronic components. This typically causes the entire data processing system to fail, since it is dependent on the electronic components.

FIG. 1 illustrates conventional attachment of memory cards 102 and 104 to a printed circuit board 120. There is typically no physical support to hold the memory cards 102 and 104 on the printed circuit board 120 beside the connectors (not shown) that hold one edge of the memory cards 102 and 104 to the printed circuit board 120.

What is needed is a support clip that provides shock and vibration protection to one or more cards attached to a substrate, while minimizing the blockage of air-flow to the cards and adjacent cards. Additionally, this support clip needs to accommodate a variety of memory card sizes.

SUMMARY OF THE INVENTION

The present invention provides a support clip that provides shock and vibration protection to one or more cards attached to a substrate, while minimizing the blockage of air-flow to the card and adjacent cards. Such cards typically have planes that are perpendicular to the plane of the substrate, and different cards with different card edge heights above the substrate can still be supported by a common support clip by adding one or more spacers over the cards with shorter height card edges.

A first aspect of the invention is directed to a method to assemble a support clip to one or more cards each attached on a substrate by a connector. The method includes identifying one or more cards that can be secured to a substrate by a support clip, wherein each card of the cards has a card edge opposite to the card connector that can be secured by the support clip; placing the support clip on each of the card edges; and physically attaching the support clip to the substrate, wherein the support clip secures the cards to the substrate.

A second aspect of the invention is directed to a method to fabricate a support clip. The method includes identifying one or more cards that can be secured to a substrate by a support clip, wherein the one or more cards are individually attached to the substrate by a connector, and wherein each card has an card edge opposite to the connector; conforming the support clip to the card edge of each card; and including one or more structures on the support clip to attach the support clip to the substrate, wherein the support clip substantially secures the cards to the substrate.

A third aspect of the invention is directed to assembled substrate with a plurality of cards secured by one or more support clips to the substrate. The assembled substrate includes a substrate; a plurality of cards attached to the substrate by a plurality of connectors, wherein each card of the plurality of cards has a connector to the substrate on one card edge and a card edge opposite to the connector; and one or more support clips that secure the plurality of cards to the substrate by clamping the card edge opposite to the connector and by attachment to the substrate.

These and other objects and advantages of the invention will become apparent to those skilled in the art from the following detailed description of the invention and the accompanying drawings.

DETAILED DESCRIPTION OF PREFERRED EMBODIMENTS OF THE INVENTION

The present invention provides a support clip for varying sizes of cards (e.g., memory cards and logic cards). The support clip provides greater shock and vibration support, while causing a minimum of blockage to air-flow to cool the card and adjacent cards. While the discussion below is directed to an application of the invention to secure memory cards to a substrate, such as a printed circuit board (PCB), the invention can also be applied to any type of card attached on any type of substrate (e.g., a multi-chip module, or another substrate upon which electrical components can be assembled).

Figure 1:
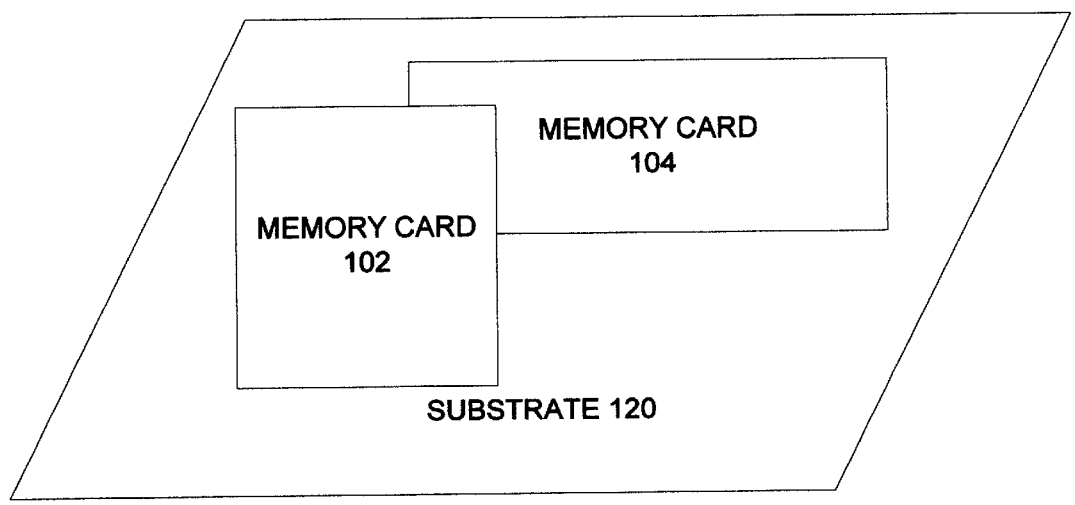
FIG. 1 illustrates conventional memory card attachment to a printed circuit board.
Figure 2:
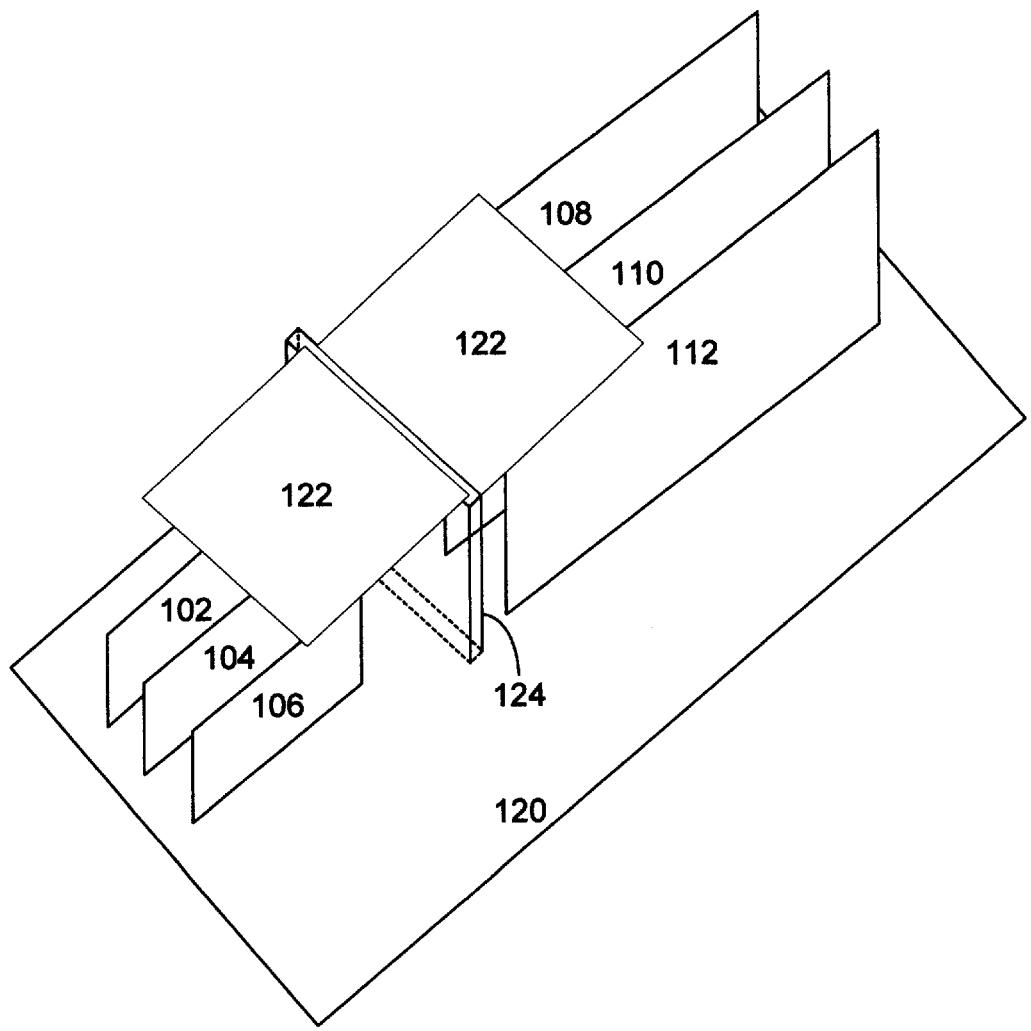
FIG. 2 illustrates a support clip to support memory cards attached to a motherboard PCB, according to one embodiment of the present invention.

FIG. 2 illustrates a support clip to support memory cards attached to a motherboard PCB, according to one embodiment of the present invention. FIG. 2 illustrates an assembly of a first set of memory cards 102, 104, and 106, and a second set of memory cards 108, 110, and 112 that are perpendicularly attached to a substrate 120. The first set of memory cards 102, 104, and 106, and the second set of memory cards 108, 110, and 112 are secured to the substrate 120 by support clip 122 (shown in partial cut-away). Support clip 122 is attached to the substrate 120 by two or more pillars. Due to the need to show the underlying cards, only pillar 124 is shown. In alternate embodiments of the invention, the support clip 122 does not cover the full length of the cards that need to be secured to the substrate. In other words, the support clip 122 that shown in partial cut-away with only pillar 124 could be a sufficient support clip for some applications, especially in applications where there is only one or two cards that need support.

Support clip 122 preferably has one or more indentations (e.g., grooves or notches) to more closely conform the support clip 122 to the card edge opposite to the connectors of the cards to be supported. These indentations are preferably made by molding, stamping, or machining the support clip 122. The support clip 122 can be fabricated from a piece of sheet metal, a molded piece of metal, a machined piece of metal, a molded piece of plastic, or a machined piece of plastic.

Figure 3:
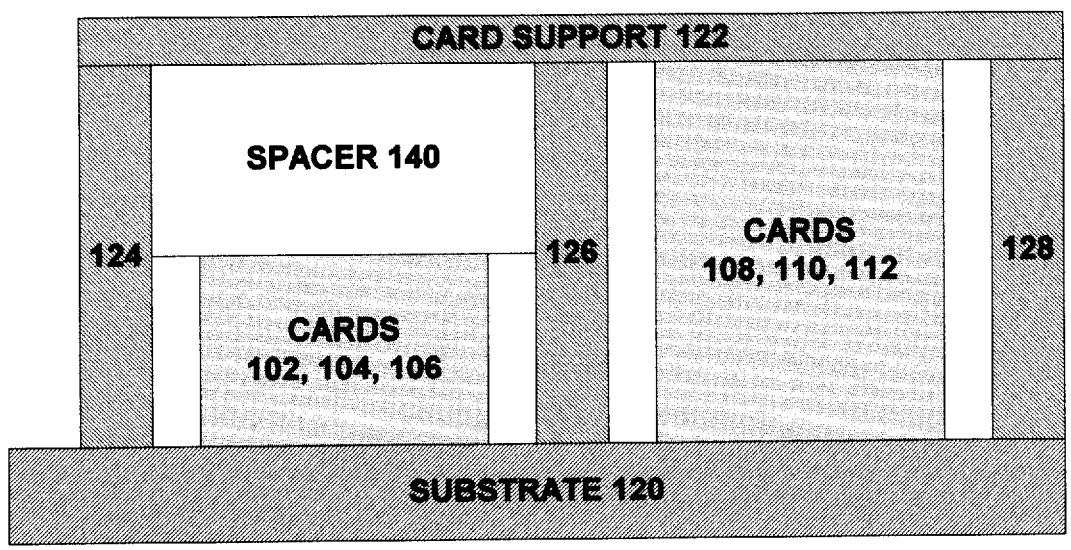
FIG. 3 illustrates two different memory card sizes with a spacer to allow both memory card sizes to be supported by a support clip, according to one embodiment of the present invention.

FIG. 3 illustrates a side view of two different memory card sizes with a spacer to allow both to be supported by a support clip, according to one embodiment of the present invention. Here, a first set of memory cards 102, 104, and 106, and a second set of memory cards 108, 110, and 112 are perpendicularly attached to a substrate 120. The first set of memory cards 102, 104, and 106, and the second set of memory cards 108, 110, and 112 are secured to the substrate 120 by support clip 122. Support clip 122 is attached to the substrate 120 by pillars 124, 126, and 128.

Preferably, a spacer 140 is placed (e.g., clipped on a card edge, or slide onto a card edge) on each of the shorter memory cards to bring each shorter memory card up to the same height as the taller memory cards. The spacer 140 can be stamped, molded, or machined from several different materials, for example, plastic, metal, ceramic, or a composite material. The spacer 140 can extend the full length of the card edge of each card, or have a length greater or less than the length of the card edge of each card. The spacer 140 is preferably indented to conform to each card edge. Once spacers are placed on all of the shorter cards to bring all the card edges opposite the connectors to the same distance from the substrate, the support clip is attached. The support clip provides shock and vibration protection to the cards.

Figure 4:
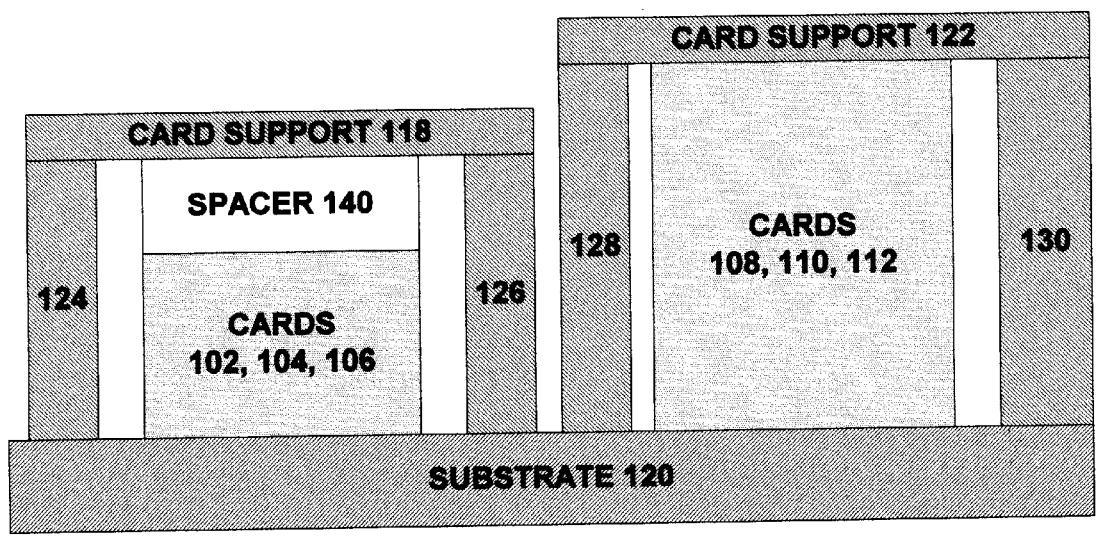
FIG. 4 illustrates a set of short memory cards with a spacer, and a set of tall memory cards, according to another embodiment of the invention.

FIG. 4 illustrates a set of short memory cards with a spacer 140, and a set of tall memory cards, according to another embodiment of the invention. Here, a first set of memory cards 102, 104, and 106, and a second set of memory cards 108, 110, and 112 are perpendicularly attached to a substrate 120. The first set of memory cards 102, 104, and 106 is secured to the substrate 120 by spacer 140 and support clip 118. The second set of memory cards 108, 110, and 112 is secured to the substrate 120 by support clip 122. Support clip 118 is attached to the substrate 120 by pillars 124 and 126. Support clip 122 is attached to the substrate 120 by pillars 128 and 130.

Figure 5:
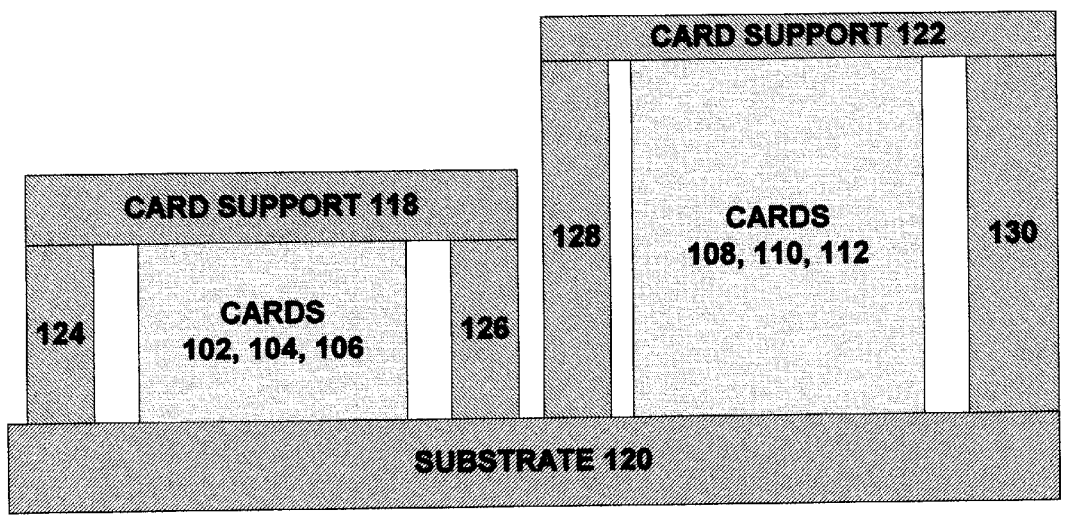
FIG. 5 illustrates the memory cards of FIG. 4 without the spacer.

FIG. 5 illustrates the memory extender of FIG. 4 without the spacers, illustrating the lack of support for the short memory cards. Here, a first set of memory cards 102, 104, and 106, and a second set of memory cards 108, 110, and 112 are perpendicularly attached to a substrate 120. The first set of memory cards 102, 104, and 106 is secured to the substrate 120 by support clip 118. The second set of memory cards 108, 110, and 112 is secured to the substrate 120 by support clip 122. Support clip 118 is attached to the substrate 120 by pillars 124 and 126. Support clip 122 is attached to the substrate 120 by pillars 128 and 130.

Figure 6:
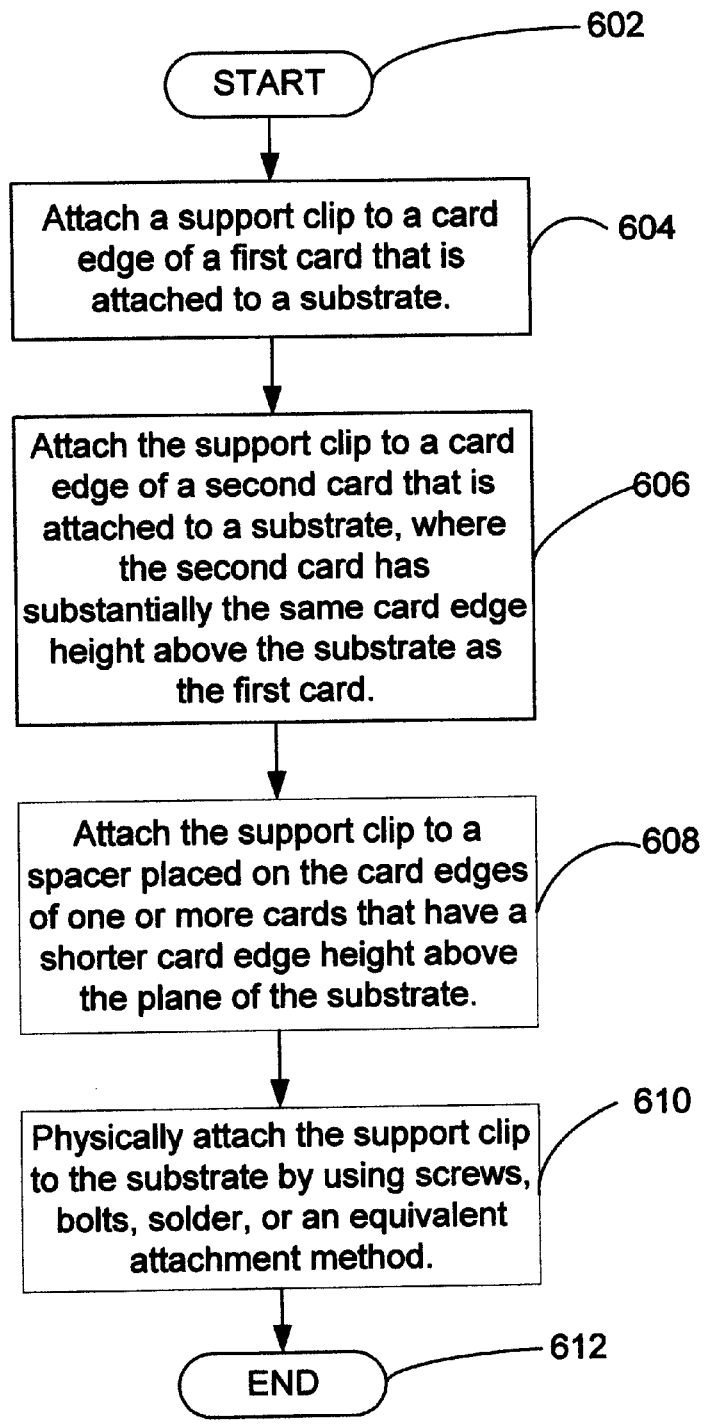
FIG. 6 shows a flow chart for a method to secure one or more card edges using a support clip in accordance with one embodiment of the present invention.

FIG. 6 shows a flow chart for a method to secure one or more card edges opposite to the connectors using a support clip in accordance with an embodiment of the present invention. The method starts in operation 602, and is followed by operation 604. In operation 604, there is an attachment of a support clip to one edge of a card that is attached to a substrate. In operation 606, the support clip is attached to a card edge of a second card that is attached to the substrate, where the second card has substantially the same card edge height above the substrate as the first card. Then operation 608 is next. In operation 608 the support clip is attached to a spacer placed on the card edges of one or more cards that have a shorter card edge height above the plane of the substrate than the first set of cards. In operation 610, the support clip is physically attached to the substrate by using screws, bolts, solder, or an equivalent attachment method. Operation 612 is the end of the method.

Figure 7:
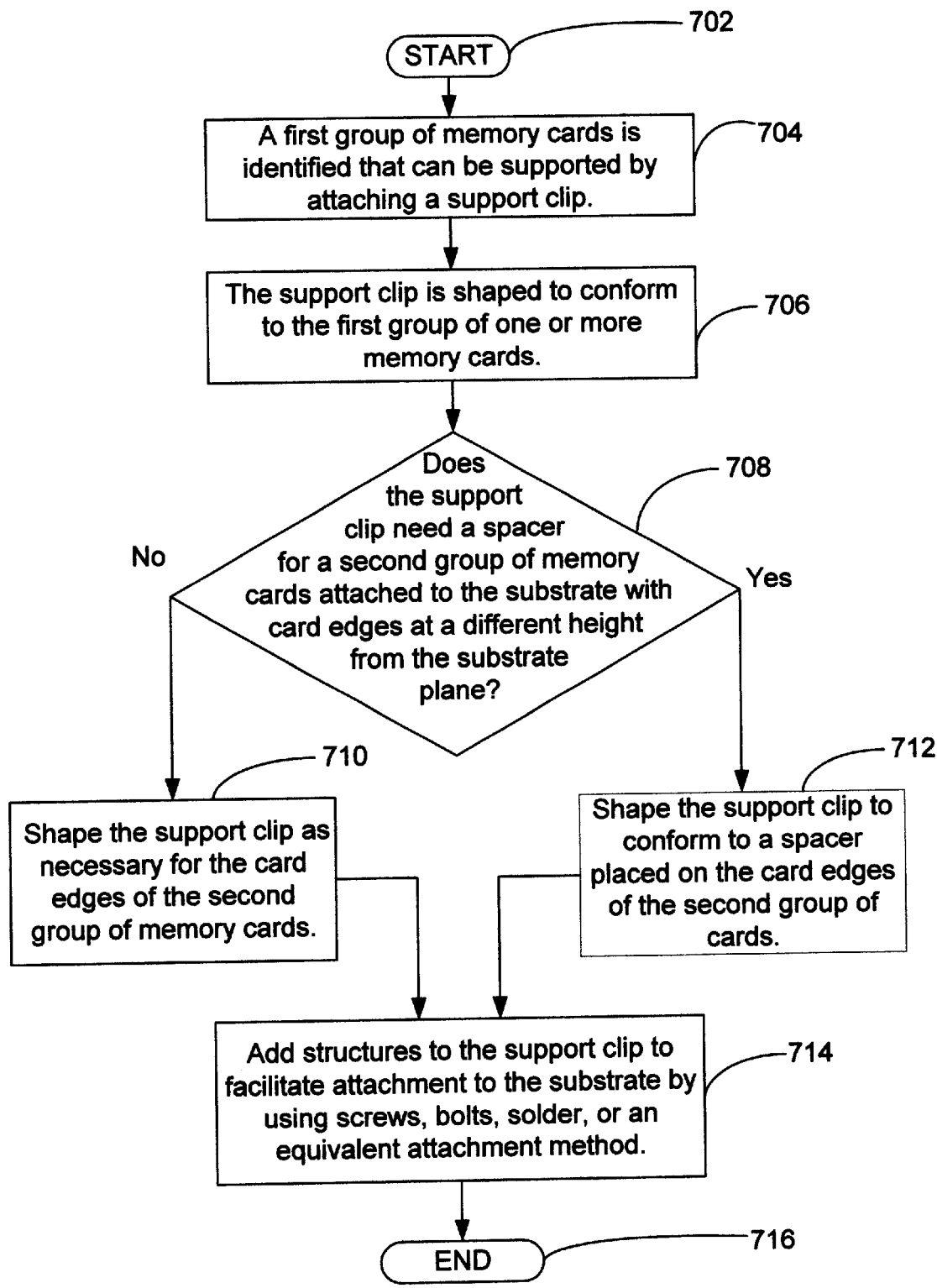
FIG. 7 shows a flow chart for a method to fabricate one or more support clips for a plurality of memory cards in accordance with one embodiment of the present invention.

FIG. 7 shows a flow chart for a method to fabricate one or more support clips for a plurality of memory cards in accordance with one embodiment of the present invention. The method starts in operation 702 and is followed by operation 704. In operation 704, a first group of memory cards is identified that can be supported by attaching a support clip. In operation 706, the support clip is shaped to conform to the first group of one or more memory cards (e.g., by conforming to the card edge opposite to the connectors). Then operation 708 is next. In operation 708, a determination is made as to whether the support clip needs a spacer for a second group of memory cards attached to the substrate with card edges at a different height from the substrate plane. If operation 708 finds the support clip does not need a spacer for the second group of memory cards, then in operation 710 the support clip is shaped as necessary for the card edges of the second group of memory cards. If operation 708 determines the support clip needs a spacer for the second group of memory cards, then in operation 712 the support clip is shaped to conform to a spacer placed on the card edges of the second group of cards. In operation 714, structures (e.g., appendages, or pillars) are added to the support clip to facilitate attachment to the substrate by using screws, bolts, solder, or an equivalent attachment method. Operation 716 is the end of the method.

Figure 8:
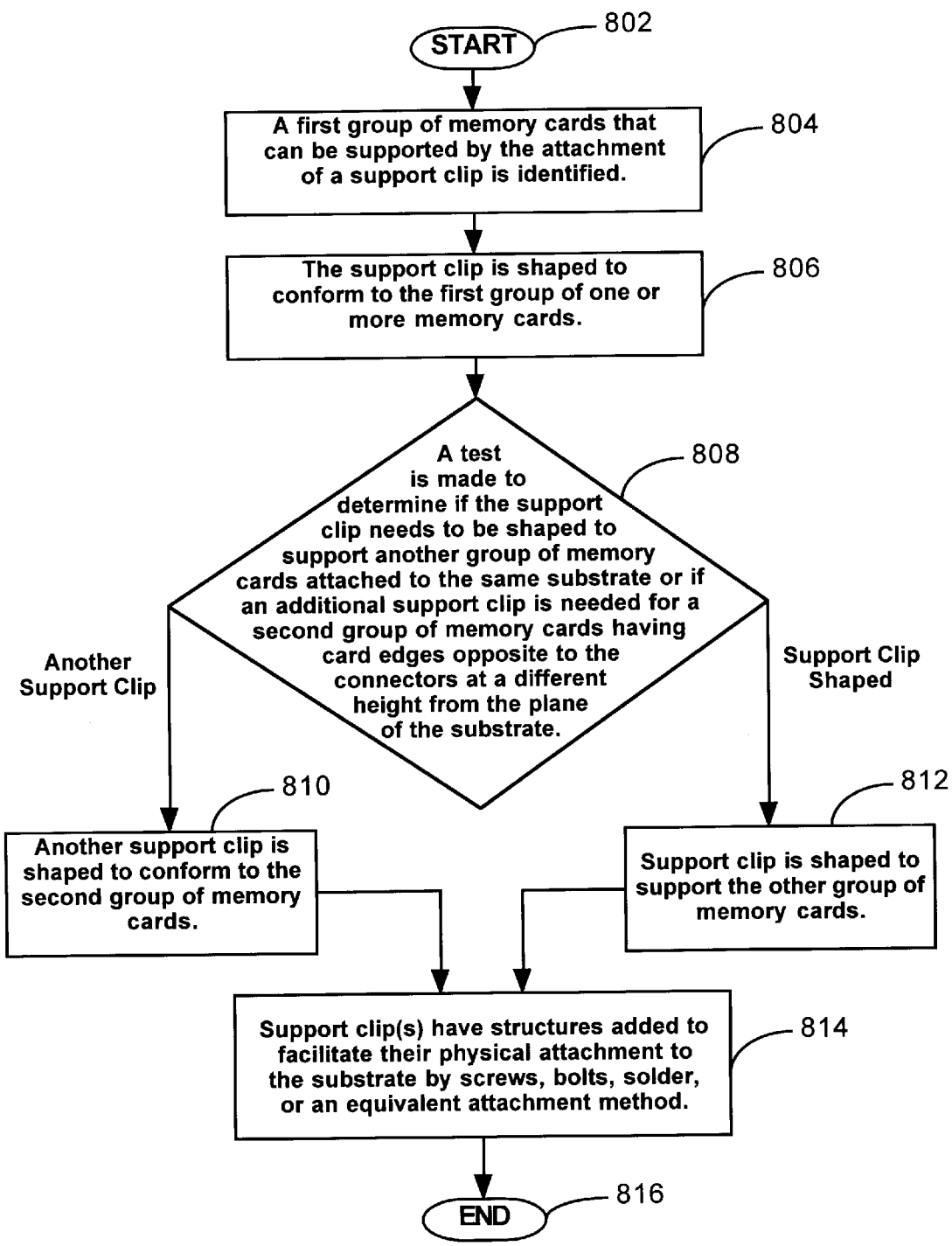
FIG. 8 shows a flow chart for a method to fabricate one or more support clips for a plurality of memory cards in accordance with one embodiment of the present invention.

FIG. 8 shows a flow chart for a method to fabricate one or more support clips for a plurality of memory cards in accordance with one embodiment of the present invention. The method starts in operation 802, and is followed by operation 804. In operation 804, a first group of memory cards that can be supported by the attachment of a support clip is identified. In operation 806, the support clip is shaped to conform to the first group of one or more memory cards (e.g., by conforming to the card edge opposite to the connectors). Then operation 808 is next. In operation 808, a test is made to determine if the support clip needs to be shaped to support another group of memory cards attached to the same substrate, or if an additional support clip is needed for a second group of memory cards having card edges opposite to the connectors at a different height from the plane of the substrate. If the test of operation 808 finds another support clip is needed, then in operation 810, another support clip is shaped to conform to the second group of memory cards (e.g., shaped to conform to the card edge opposite to the connectors of the second group of memory cards). If the test of operation 808 determines that the support clip can be shaped to support another group of memory cards, then operation 812 is next, where the support clip is shaped to support the other group of memory cards. In operation 814, the support clip(s) have structures (e.g., appendages, or pillars) added to facilitate their physical attachment to the substrate by screws, bolts, solder, or by an equivalent attachment method. Operation 816 is the end of the method.

The embodiments of the invention discussed above used examples of PCBs. Preferred embodiments of the invention can be applied to PCBs using through-hole technology or surface mount technology, or can be applied to other types of electrical component substrates (e.g., multi-chip modules and flexible substrates).

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method to assemble a support clip to one or more cards each attached on a substrate by a connector, comprising:

identifying one or more cards that can be secured to a substrate by a support clip, wherein each card of said one or more cards has an card edge opposite to said connector that can be secured by said support clip;

placing a spacer on a card edge of at least one of said cards, said spacer is rigid;

placing said support clip on said spacer to substantially support said spacer and said card, wherein said spacer enables said support clip to substantially support simultaneously more than one of said cards having differing size;

placing said support clip on each of said card edges; and physically attaching said support clip to said substrate, wherein said support clip secures said one or more cards to said substrate.

2. The method of claim 1, wherein said substrate has a plane, wherein each of said one or more cards has a plane that is substantially perpendicular to said plane of said substrate.

3. The method of claim 1, wherein said substrate is chosen from substrates consisting of: a printed circuit board (PCB), a multi-chip module (MCM), and a flexible substrate.

4. The method of claim 1, wherein said support clip includes a plurality of indentations.

5. The method of claim 1, wherein said support clip is chosen from a group of support clips consisting of: a piece of sheet metal, a molded piece of metal, a machined piece of metal, a molded piece of plastic, or a machined piece of plastic.

6. The method of claim 1, wherein a plurality of support clips secures a plurality of memory cards to said substrate.

7. A method to fabricate a support clip, comprising:

identifying one or more cards that can be secured to a substrate by a support clip, wherein said one or more cards is individually attached to said substrate by a connector, and wherein each card of said one or more cards has an card edge opposite to said connector;

conforming said support clip to said card edge of each card of said one or more cards;

utilizing a spacer configured to be coupled to at least one of said one or more cards, wherein said spacer allows said support clip to substantially secure more than one of said cards of varying size at the same time, said spacer is rigid; and including one or more structures on said support clip to attach said support clip to said substrate, wherein said support clip thereby substantially secures said one or more cards to said substrate.

8. The method of claim 7, wherein said substrate has a plane, wherein each of said one or more cards has a plane that is substantially perpendicular to said plane of said substrate.

9. The method of claim 7, wherein said one or more cards includes a memory card.

10. The method of claim 7, wherein said one or more cards is selected from a group of cards consisting of: a printed circuit board (PCB), a multi-chip module (MCM), and a flexible substrate.

11. The method of claim 7, wherein said support clip includes a plurality of indentations.

12. The method of claim 7, wherein said support clip is chosen from a group of support clips consisting of: a piece of sheet metal, a molded piece of metal, a machined piece of metal, a molded piece of plastic, or a machined piece of plastic.

13. An assembled substrate with a plurality of cards secured to said substrate, comprising:

a substrate;

a first card of a first height coupled to said substrate;

a first support clip for coupling to and securing said first card to said substrate;

a second card of a second height less than said first height and coupled to said substrate; and a spacer disposed between a second support dip and an edge of said second card, said second support clip secures said second card to said substrate, said spacer is rigid.

14. The assembled substrate of claim 13, wherein said substrate has a plane, each of said first and second cards has a plane that is substantially perpendicular to said plane of said substrate.

15. The assembled substrate of claim 13, wherein each of said first and second cards is selected from a group of cards consisting of: a printed circuit board (PCB), a multi-chip module (MCM), and a flexible substrate.

16. The assembled substrate of claim 13, wherein said substrate is selected from a group of substrates consisting of: a printed circuit board (PCB), a multi-chip module (MCM), and a flexible substrate.

17. The assembled substrate of claim 13, wherein said spacer comprises a material selected from the group consisting of: plastic, metal, ceramic, and a composite material.

18. The assembled substrate of claim 13, wherein each of said first and second support chips is chosen from a group of support clips consisting of: a piece of sheet metal, a molded piece of metal, a machined piece of metal, a molded piece of plastic, and a machined piece of plastic.

19. An apparatus for protecting cards of varying size from shock and vibration, said apparatus comprising:

a support clip for coupling to a first card of a first height, said support clip configured to support said first card such that said first card is protected from said shock and said vibration; and a spacer disposed between said support clip and an edge of a second card of a second height less than said first height, said support clip is able to support both said first card and said second card such that said first card and said second card are concurrently protected from said shock and said vibration, said spacer is rigid.

20. The apparatus of claim 19, wherein said spacer comprises a material selected from the group consisting of: plastic, metal, ceramic, and a composite material.

21. The apparatus of claim 19 further comprising:

attachment means for coupling said support clip to a substrate.

* * * * *